US011206078B1

(12) United States Patent
Masoomzadeh et al.

(10) Patent No.: US 11,206,078 B1
(45) Date of Patent: Dec. 21, 2021

(54) SYSTEM FOR LOW-LATENCY SATELLITE SUBBEAM HANDOVER

(71) Applicant: AMAZON TECHNOLOGIES, INC., Seattle, WA (US)

(72) Inventors: Ali Masoomzadeh, Bellevue, WA (US); Deepak, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 5 days.

(21) Appl. No.: 16/886,359

(22) Filed: May 28, 2020

(51) Int. Cl.
H04B 7/06 (2006.01)
H04B 7/185 (2006.01)
H04B 7/195 (2006.01)

(52) U.S. Cl.
CPC ......... *H04B 7/18513* (2013.01); *H04B 7/195* (2013.01)

(58) Field of Classification Search
CPC ...... H01Q 3/267; H01Q 21/24; H01Q 3/2682; G01C 21/20; H04B 7/18517; H04B 7/043; H04B 7/18523; H04B 7/18504; H04L 65/80; H04L 65/4069; H04L 67/2842
See application file for complete search history.

(56) References Cited

U.S. PATENT DOCUMENTS 6,101,385 A * 8/2000 Monte ................ H04B 7/18539
455/427
2017/0041830 A1  2/2017 Davis et al.
2018/0026709 A1 * 1/2018 Buer .................. H04B 7/18534
370/316
2018/0279249 A1  9/2018 Lv
2018/0359670 A1 12/2018 Fang

OTHER PUBLICATIONS

Persaud, Amarnauth G., "Non-final Office Action dated May 27, 2021", U.S. Appl. No. 16/847,060, The United States Patent and Trademark Office, dated May 27, 2021.
Kilic, et al., "Antenna aperture size reduction using subbeam concept in multiple spot beam cellular satellite systems", Radio Science, vol. 44, RS3001, May 2009, 9 pgs. Retrieved from the Internet: URL: https://agupubs.onlinelibrary.wiley.com/doi/pdf/10.1029/2008RS004052.
Masoomzadeh, Ali, "Patent Application Filed with the The United States Patent and Trademark Office on Apr. 13, 2020", U.S. Appl. No. 16/847,060, The United States Patent and Trademark Office, dated Apr. 13, 2020.

* cited by examiner

*Primary Examiner* — Phuoc H Doan
(74) *Attorney, Agent, or Firm* — Lindauer Law, PLLC

(57) ABSTRACT

Satellites provide communication between devices such as user terminals and gateways to other networks, such as the Internet. Non-geosynchronous orbit satellites move relative to user terminals, passing in and out of communication over time. The user terminal itself may also move. Each satellite maintains a plurality of subbeams, each directed towards a different area on the Earth for a portion of an orbit. Based on a predicted location for the user terminal, a handover from a first subbeam to a second subbeam is determined. To minimize disruption due to the handover, communication resources associated with the second subbeam are allocated and provided to the user terminal and the satellite in advance. At the handover time, if the user terminal is within a threshold distance of the predicted location, the user terminal may transition to using the second subbeam. Otherwise, the user terminal may continue to use the first subbeam.

20 Claims, 5 Drawing Sheets

HANDOVER DATA 166

| PARAMETER 502 | VALUE 504 |
|---|---|
| UT IDENTIFIER | 568451 |
| SAT ID | 3021 |
| HANDOVER TIME | 2210 |
| RESOURCE PRIORITY | 125 |
| SUBBEAM IDENTIFIER | 7 |
| PREDICTED LOCATION | 31.07, -98.31 |
| HANDOVER LIKLIHOOD | 0.95 |
| ... | ... |

GRANT DATA 168

| PARAMETER 502 | VALUE 504 |
|---|---|
| UT IDENTIFIER | 568451998873 |
| TEMPORARY UT ID | 3 |
| SAT ID | 3021 |
| HANDOVER TIME | 2210 |
| SYNCHRONIZATION DATA | 11 |
| SUBBEAM IDENTIFIER | 7 |
| SUBBEAM FOOTPRINT DATA | 31.03,-98.17,10 |
| UL/DL FREQUENCIES | 15.250 / 45.105 |
| TIMESLOT | 5 |
| GRANT EXPIRATION TIME | 2832 |
| ... | ... |

TRACKING DATA 184

| PARAMETER 502 | VALUE 504 |
|---|---|
| CURRENT LOCATION (OF UT) | 31.05, -98.48 |
| PREDICTED LOCATION | 31.07, -98.31 |
| HANDOVER TIME | 3021 |
| AZIMUTH/ELEVATION | 176/34 |
| TOF CORRECTION | +509 NS |
| ... | ... |

LINK STATUS DATA 324

| PARAMETER 502 | VALUE 504 |
|---|---|
| UT IDENTIFIER | 568451 |
| HANDOVER TIME | 2210 |
| SUBBEAM IN USE | 7 |
| ERROR CODE | NONE |
| ... | ... |

FIG. 5

SYSTEM FOR LOW-LATENCY SATELLITE SUBBEAM HANDOVER

BACKGROUND

Satellites in non-geosynchronous orbits (NGO) move relative to a body they are orbiting, such as the Earth. Satellites in NGOs provide several advantages compared to geosynchronous orbits, including reduced latency, shorter communication path lengths, and so forth. Devices using an NGO satellite for communication may also be moving relative to the Earth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates data associated with operation of the system, according to some implementations.

Figure 1:
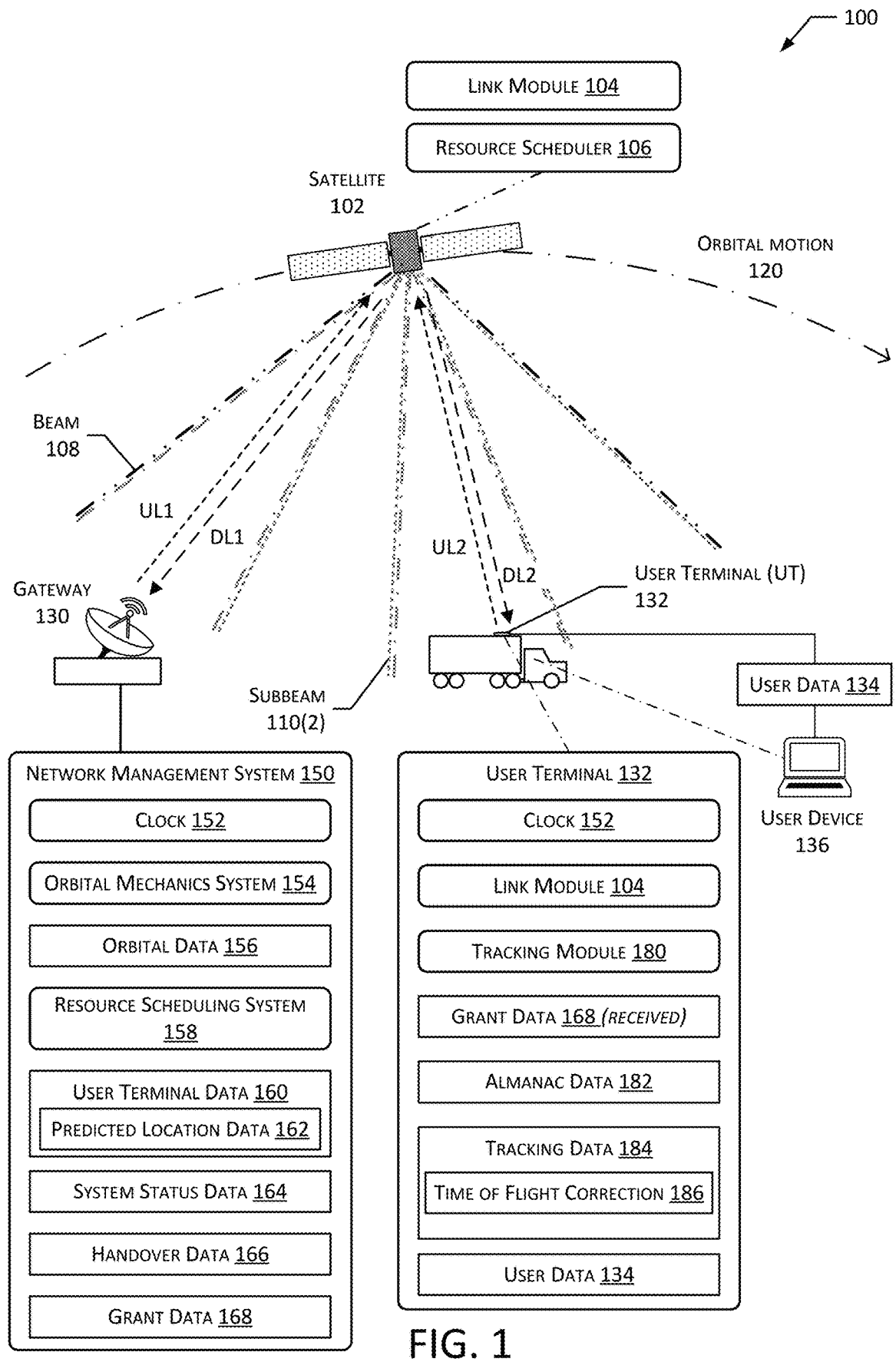
FIG. 1 illustrates a system that uses preassigned grants to provide low latency handover of communication service for a user terminal from a first subbeam on a satellite to a second subbeam, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Non-geosynchronous orbit (NGO) satellites move relative to a body such as the Earth, Moon, Mars, and so forth. Satellites in NGOs may be part of a network to provide communication service between devices, such as user terminals (UT) located on or near the body. For example, a first UT on a first location on the Earth may send user data to a first satellite that is in range of the first UT. The first satellite may send the user data to a gateway that is part of a ground station, another satellite, and so forth. Likewise, data destined for the first UT may be sent by the gateway to the first satellite, which then sends the data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. In comparison, a geosynchronous satellite has an orbital period that coincides with the rotation of the earth, so a geosynchronous satellite appears to remain motionless with respect to the earth.

Signals between the UT and the satellite are limited to travelling at the speed of light. The farther away a satellite is from the UT, the longer it takes for a signal to travel to the satellite and then travel back to earth. For example, a hop (sending a signal to the satellite and back down to the ground, or vice versa) to a geosynchronous satellite introduces a delay of at least 240 milliseconds (ms). Additional delays due to signal processing, buffering, and so forth may also be present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency. As a result, compared to using geosynchronous satellites, the use of NGO satellites significantly reduces latencies due to signal travel times.

Several factors limit the use, number, and placement of geosynchronous satellites. Orbital dynamics, fuel consumption required to keep a satellite in a particular orbit, radio propagation characteristics, and so forth result in a finite number of geosynchronous orbital "slots". Given these limitations and the increasing demand for communication services, geosynchronous satellites are unable to satisfy the increasing demands of communication services.

Using a constellation of many NGO satellites offers significant benefits. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

Each satellite may use one or more antennas or antenna elements to provide a beam for transmission and reception of radio signals. For example, the satellite may have a phased array antenna that allows for gain in a particular direction. Compared to a non-directional radiator, this gain directs the energy of transmitted radio frequency signals in that particular direction. This increases the strength of the signal at a receiver in the UT. Likewise, the gain results in improved receive signal strength at the satellite due to the gain.

The beam provided by the satellite may comprise a plurality of subbeams. Subbeams on a satellite may use different frequencies, timeslots, and so forth, to communicate to the UT. Each subbeam provides coverage of a particular geographic area or "footprint". Compared to a single beam, subbeams provide several advantages. For example, by using subbeams, radio frequencies may be reused by the same satellite and other satellites to service different areas. This allows increased density of UTs and bandwidth.

During a pass over a particular location on the Earth, each subbeam may be targeted to a geographic location on the Earth. While that target geographic location is in range of the satellite, the subbeam tracks the target location. As the satellite moves in orbit, the boundary of the footprint may change due to the relative angle between the satellite and the earth. For example, the footprint boundary may change from approximately an oval shape while the satellite is low on the horizon relative to the target location, a circular shape while directly overhead, then an oval shape as the satellite nears the opposite horizon. As the satellite moves, a subbeam may be retargeted to another target location. In this configuration, instead of the subbeam sweeping along the ground track of the satellite, the subbeam loiters on a first area relative to the Earth, then is redirected to a second area.

In addition to the satellites moving, the UT may also be in motion. For example, the UT may be used on a craft such as a car, boat, aerostat, balloon, drone, airplane, train, and so forth. Continuing the example, the UT may use the constellation of satellites to provide internet connectivity to a train. This movement may result in the UT moving from the footprint of a first subbeam that is currently providing communication service to a second subbeam. To continue to provide communication service to the UT, a handover operation is needed to transfer from the first subbeam to the second subbeam.

Traditionally such a handover has introduced significant delays. For example, as one or more metrics associated with communication to a first satellite's first subbeam such as signal strength drops below a threshold level, the UT may try to establish communication using a second subbeam. However, the protocols associated with such an ad hoc transition may result in delays exceeding several seconds while communication is established with the second subbeam. Additionally, such techniques are inefficient. For example, the extended handover delays from one subbeam to another prevent the satellite from using that time to transfer user data, reducing overall utilization of the satellite. Resource scheduling and utilization is also impaired as additional capacity on each subbeam may need to be reserved to account for unknown UTs that may use that subbeam in the future. As a result, traditional systems result in poor performance to the UT in the form of latency and delays resulting from the handover as well as impaired utilization of the satellites while trying to maintain reserve capacity.

Described in this disclosure is a system and associated techniques for providing low latency handover of communication service for a UT from one subbeam of a satellite to another subbeam. A network management system uses an orbital mechanics system to determine orbital data that is indicative of a state of a particular satellite at a specified time. For example, the orbital mechanics system may use orbital elements that represent characteristics of the orbit of the satellites in the constellation to determine orbital data that predicts location, velocity, and so forth of a particular satellite at a particular time. Other data such as scheduled maneuvers may also be considered in the determination of the orbital data.

A resource scheduling system uses information such as the orbital data, user terminal data, and system status data to determine handover data. The user terminal data provides information about the location of a UT. This information is used to determine a predicted location of the UT at a particular time. The system status data may comprise information such as which UTs are currently transferring data, which satellites are currently in use, capacity available at the gateways, and so forth.

The resource scheduling system may determine handover data at regular intervals. For example, handover data may be generated for handover assessment intervals that are five seconds long. In other implementations, the handover data may be determined on demand, at irregular intervals, and so forth. The predicted location may be determined for a next handover assessment interval.

Using the orbital data and the predicted location of the UT, the resource scheduling system is able to determine whether a satellite and its associated subbeams will be in range of the predicted location of UT during a time interval in the future, the footprint of individual subbeams, and so forth. The resource scheduling system may then use the system status data to determine handover data indicative of a change in subbeam for the UT as it moves from one subbeam to another.

The handover data provides information to a first satellite that is currently providing communication service to a first UT using a first subbeam as to when a handover in communication service to a second subbeam of the first satellite will take place and information about the second subbeam. For example, the handover data may include a UT identifier indicative of a particular UT, handover time, and so forth.

Grant data may be generated that is indicative of one or more parameters associated with communication between the first UT and the second subbeam at the handover time. For example, the grant data may indicate information about a subbeam time synchronization signal to be used, the handover time, uplink frequency, downlink frequency, timeslot that is assigned to the first UT for use, and forth. The grant data may be generated by one or more of the network management system or the first satellite. For example, the first satellite may manage its onboard resources based on handover data that it has received and predicted location received from the network management system, the first UT, or another source. Continuing the example, the first UT may determine and send the information indicative of a predicted location to the first satellite.

The grant data may be provided to the first satellite and the first UT. The first satellite and the first UT now have the information needed to coordinate and provide a low latency handover of communication service from the first subbeam to the second subbeam.

Before the handover time, the first UT may receive almanac data indicative of orbital elements of the orbit of the first satellite. For example, the almanac data may comprise two-line elements for the satellites in the constellation. A tracking module in the first UT uses the almanac data and the grant data to determine tracking data for the first satellite, as indicated in the grant data. The tracking data may comprise a time of flight correction. For example, using the next satellite identifier from the grant data, the two-line elements are retrieved from the almanac data. The location of the first UT may be used with the almanac data to determine tracking data indicative of azimuth, elevation, distance to the first satellite, and so forth at the handover time. This determination may be ongoing. For example, the first UT may determine tracking data every second. The tracking data may be determined using the predicted location of the first UT. The time of flight correction is based at least in part on the propagation time of signals between the first UT and the first satellite. For example, as both the first UT and the first satellite positions change over time, the distance between the first UT and the first satellite changes, changing the amount of time it takes for a signal to travel between the first UT and the first satellite.

At or before the handover time, the first UT receives a time synchronization signal from the second subbeam of the first satellite. The first UT, using the grant data and previously acquired almanac data, has determined the tracking data in advance, including the time of flight correction. The predicted location may be used to determine the predicted time of flight correction at the handover time.

A link module of the first UT uses the time synchronization signal and the time of flight correction to coordinate timing of communication between the first UT and the first satellite using the second subbeam. For example, as the first satellite moves closer to the UT, signals sent at later times will reach the first satellite slightly sooner than expected. These changes in time of flight can introduce timing errors that can adversely affect communication performance. The first UT may use the time of flight correction to determine a time offset value. The time offset value specifies how much the transmit timing of signals to the first satellite should be advanced or delayed such that the signals arrive at the first satellite within a threshold interval of a desired time onboard the first satellite. For example, the first UT adjusts when it transmits a first signal based on the time offset value and the time synchronization signal. This adjustment of the time offset value may be determined based on the distance between the predicted location of the first UT and the expected location of the first satellite at that time.

From the perspective of the satellites in the constellation, each satellite is receiving signals from UTs in which the timing is tightly coordinated to, and synchronized with, the internal clock of the satellite. This allows greater utilization of the communication link by reducing the time between transmission of frames, providing more time for transmitting user data. By performing the time offset at the UT, the processing workload of the first satellite is substantially reduced. This reduces the cost and complexity of the satellite, reducing overall system cost.

The first UT may make a determination to use the grant data and transfer to the second subbeam, or maintain communication using the first subbeam. In one implementation, the first UT may compare the predicted location with an actual location at the handover time. If the actual location is not within a threshold distance of the predicted location, the first UT may continue communications with the first subbeam. In comparison, if the actual location is within the threshold distance of the predicted location, the first UT may proceed to communicate with the first satellite using the second subbeam.

By having the grant data in advance, the first UT is ready before the handover time for the handover operation. Instead of a lengthy protocol to establish communication service using the second subbeam, the system as described in this disclosure allows the first satellite and the first UT to quickly establish communication. At the appointed handover time, the first satellite may have allocated resources of the second subbeam to handle the communication service to the first UT. Because the grant data provides in advance the details about the communication link, negotiation for communication parameters between the first satellite and the first UT for the second subbeam is significantly reduced or eliminated altogether. As a result, communication with the second subbeam of the first satellite is rapidly established. For example, an interruption of less than 20 milliseconds may be experienced during a handover. This provides a substantial decrease in latency due to subbeam handovers.

Overall efficiency of the system in transferring user data is also substantially improved by using the system and techniques described here. For example, the reduced time spent establishing communication between the UT and the second subbeam allows more time for user data to be sent.

The system is able to provide the decrease in latency due to handovers without the use of extensive hardware at the first UT. For example, the first UT is able to use a single antenna array and a single transceiver. In comparison, other systems may use dual antennas and dual transceivers operating to establish communication with the second subbeam before discontinuing communication with the first subbeam. While this may reduce the latency due to a handover, it significantly increases the complexity and cost of the UT.

By using the system and techniques described in this disclosure, a constellation of NGO satellites is able to provide moving user terminals with very low latency handovers of communications between subbeams of a satellite in the constellation. This allows a cost-effective UT to provide ongoing low latency communication service to an end user.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), ..., 102(S) that are each in non-geosynchronous orbits (NGOs). The constellation may comprise hundreds or thousands of satellites 102. These satellites 102 may be arranged in different orbits. Some of these orbits may be at different altitudes. The satellites 102 in orbit are in constant motion with respect to the Earth. In this illustration, orbital motion 120 is depicted with an arc pointed to the right. A satellite 102 is shown. Additional satellites 102 may be located ahead of, behind, above, or below the satellite 102.

Each satellite 102 may include a link module 104 and resource scheduler 106. The link module 104 is used to establish communication with other devices. The link module 104 may include one or more transmitters, receivers, antennas, digital signal processors, and so forth. The resource scheduler 106 may comprise one or more processors executing instructions to manage the link module 104 and maintain communication service such as a radio communication link with other devices.

A beam 108 associated with the satellite 102 is depicted. The beam 108 comprises a volume within which one or more of transmission or reception of radio signals by the satellite 102 takes place. For example, the beam 108 may comprise a volume within which a minimum gain field strength of radio energy is provided by a transmitter coupled to an antenna. The beam 108 may comprise a plurality of subbeams 110(1), 110(2), ..., 110(S). Each subbeam 110 provides gain for radio signals in a particular direction. In one implementation, the link module may comprise a phased array antenna that is capable of simultaneously providing multiple subbeams 110. A subbeam 110 may be targeted to cover a specified portion of the Earth while the satellite 110 is in a particular portion of the orbit. For example, the link module 104 may adjust the direction of the subbeam 110 relative to the satellite 102 to keep the subbeam 110 pointed at a target location on the Earth while the satellite 102 is above the horizon and in range of that target location. As the satellite 102 moves out of range of the target location, the subbeam 110 may be retargeted to another target location that is moving into range. The different subbeams 110 on the satellite 102 may be directed to different target locations. In another implementation, the subbeam 110 may continuously sweep across the surface of the Earth, such as in a line parallel to a ground track of the satellite 102. Due to dispersion and other effects, the coverage area or footprint of two or more subbeams 110 may overlap. The subbeams 110 are discussed in more detail with regard to FIG. 2.

One or more gateways 130 are in communication with one or more satellites 102 and pass data between the satellites 102 and other networks, such as the Internet. Each gateway 130 may comprise a ground station with one or more receivers, transmitters, antennas, routers, and so forth.

User terminals (UTs) 132 may comprise one or more transmitters, receivers, antennas, digital signal processors, processors, and so forth. The UT 132 passes user data 134 between the constellation of satellites 102 and a user device 136. The user data 134 includes data originated by the user device 136 or addressed to the user device 136. The UT 132 may be stationary or moving, relative to the Earth. For example, the UT 132 may be installed on a car, boat, aerostat, drone, airplane, train, and so forth. The UT 132 is described in more detail below.

A network management system 150 is in communication with one or more gateways 130 and, via those gateways 130, the satellites 102 and the UTs 132. The network management system 150 coordinates operation of the satellites 102, gateways 130, UTs 132, and other resources of the system 100.

A clock 152 provides timing data for the network management system 150. In some implementations the clock 152 may be a global positioning system (GPS) disciplined clock or an atomic clock that provides a high accuracy and high precision time source. Output from the clock 152 may be used to coordinate operation of the system 100.

An orbital mechanics system 154 determines orbital data that is indicative of a state of a particular satellite 102 at a specified time. The orbital mechanics system 154 may comprise one or more computing devices. In one implementation, the orbital mechanics system may use orbital elements that represent characteristics of the orbit of the satellites 102 in the constellation to determine orbital data 156 that predicts location, velocity, and so forth of particular satellites 102 at particular times or time intervals. For example, the orbital mechanics system 154 may use data obtained from actual observations from tracking stations, data from the satellites 102, scheduled maneuvers, and so forth to determine the orbital elements. The orbital mechanics system 154 may also consider other data, such as space weather, collision mitigation, orbital elements of known debris, and so forth.

The network management system 150 includes a resource scheduling system 158. The resource scheduling system 158 uses information such as the orbital data 156, user terminal data 160, system status data 164, and so forth to determine handover data 166. The resource scheduling system 150 may also provide management of subbeams 110. For example, the resource scheduling system 158 may determine the target locations for respective subbeams 110 on the satellite 102 during a particular portion of the orbit. Using the orbital data 156, the resource scheduling system 158 may determine when a particular target location is going to be in or out of range of the subbeams 110 provided by the satellite 102. The resource scheduling system 158 may provide data indicative of when a subbeam 110 is to move from a first target location to a second target location. Likewise, the resource scheduling system 158 may coordinate the handover of communication service for a UT 132 from a first satellite 102 or a first subbeam 110(1) provided by that first satellite 102 to a second subbeam 110(2) or a second satellite 102, as needed.

The user terminal data 160 may comprise information such a geographic location of a particular UT 132. The user terminal data 160 may include predicted location data 162 indicative of a predicted location of the UT 132 at a future time. The predicted location data 162 may be determined by the UT 132, the network management system 150, or other devices. In one implementation the network management system 150 may receive location data from the UT 132 that is updated every second. Based on the location data for the previous 10 seconds, the predicted location may be calculated. For example, a linear quadratic estimation (LQE) algorithm may be used to determine the predicted location. In another implementation, the UT 132 may determine the predicted location data 162 and send it to the network management system 150. The determination of the predicted location data 162 may be based at least in part on data from a navigation system associated with a vehicle to which the UT 132 is attached. For example, a navigation system in an automobile may be presenting to the driver a proposed route to follow to reach a destination specified by the driver. The navigation system may provide information about a pre-planned path about the predicted locations along the route. In another example, an autopilot onboard an aircraft or boat may provide similar information, such as a flight path, cruise route, and so forth.

The user terminal data 160 may also include other information such as a priority assigned to user data 134 associated with that UT 132, information about the communication capabilities of that particular UT 132, and so forth. For example, a particular UT 132 in use by an uncrewed aerial vehicle may be assigned a higher priority relative to a UT 132 used by a private automobile. Over time, different versions of UTs 132 may be deployed, having different communication capabilities such as being able to operate at particular frequencies, supporting different signal encoding schemes, having different antenna configurations, and so forth.

The user terminal data 160 may also include information about the vehicle associated with the UT 132. For example, the user terminal data 160 may include information such as a maximum speed of the vehicle that the UT 132 is attached to, maximum expected distance travelled during a specified time interval, and so forth. In another example, the user terminal data 160 may include information as to whether the vehicle is under active control. For example, a UT 132 attached to a free-flying balloon may not move with the same degree of control as a powered aircraft. The resource scheduling system 158 may use the maximum speed of the vehicle associated with the UT 132 to determine a "worst case" predicted location assuming travel at that maximum speed.

The system status data 164 may comprise information such as which UTs 132 are currently transferring data, satellite availability, current satellites 102 in use by respective UTs 132, capacity available at particular gateways 130, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, due to maneuvering, and so forth. The capacity available at particular gateways 130 may be indicative of available throughput to transfer data, availability of communication resources, and so forth. For example, the gateway 130 may have unallocated or available capacity for 2 terabits per second of data transfer between the satellites 102 and a network such as the Internet. In another example, the gateway 130 may currently be in communication with 20 satellites 102 while having available antennas, transceivers, and so forth to communicate with another 4 satellites 102. In some implementations the orbital mechanics system 154 may determine the system status data 164 that is indicative of a relative angle between a current subbeam 110 target and the horizon of the Earth. For example, as at satellite 102 moves away from a subbeam 110 target, the angle between the horizon and the subbeam 110 target decreases. To mitigate radio frequency interference with other satellites 102, various actions may be taken by the satellite 102 including decreasing transmit power, changing frequencies, changing modulation, and so forth.

The system status data 164 may be indicative of past status, current status, future status, and so forth. For example, the past status may be indicative of previously used bandwidth by one or more of the subbeams 110, number of UTs 132 that were within one or more of the subbeams 110, meteorological conditions within a subbeam 110, and so forth. The current status may comprise information obtained during a current handover assessment interval. The future status may be indicative of a predicted bandwidth to be used by one or more of the subbeams 110. The predicted bandwidth may be based on data traffic for a specified interval of time based on previous transfers of user data 134. In another example, the future status may be indicative of a satellite 102 being unavailable to provide communication service due to scheduled maneuvering, scheduled maintenance, scheduled decommissioning, predicted meteorological conditions within a subbeam 110, and so forth.

The handover data 166 is indicative of information such as a UT identifier indicative of a particular UT 132, a handover time indicative of when a handover is to occur, next subbeam data, a next satellite identifier (ID) that is indicative of the next satellite 102 that will be providing communication service to the specified UT 132, and so forth. For example, the handover data 166 may specify a handover of communication service for the UT 132 from a first subbeam 110(1) to a second subbeam 110(2) of a first satellite 102. In another example, the handover data 166 may specify a handover of communication service for the UT 132 from a subbeam 110 of a first satellite 102 to a subbeam 110 of a second satellite 102.

The resource scheduling system 158 may determine handover data 166 at regular intervals. For example, handover data 166 may be generated for handover assessment intervals that are five seconds long. In other implementations, the handover data 166 may be determined on demand, at irregular intervals, and so forth.

In one implementation, the handover data 166 may involve the resource scheduling system 158 using the orbital data 156 and the predicted location of the UT 132 to determine if the UT 132 will be moving from the footprint of one subbeam 110 currently providing communication service to the UT 132 to the footprint of another subbeam 110. Based on the orbital data 156 and the predicted location data 162 of each UT 132, the next subbeam 110 may be determined. For example, the predicted location of the UT 132 at the handover time may be within the footprint of the second subbeam 110(2). Continuing the example, the satellite 102 may be expected to begin providing communication service to the UT 132 at the handover time using the second subbeam 110(2). In the event the satellite 102 is unable to allocate resources to provide communication service to the UT 132 using the second subbeam 110(2), exception data indicative of this may be generated and provided to one or more of the network management system 150, the UT 132, or other devices. Likewise, if the UT 132 maintains communication using the first subbeam 110(1) and does not use the second subbeam 110(2), data indicative of this may be sent to the network management system 150.

Grant data 168 may be generated that is indicative of one or more parameters associated with communication between the UT 132 and the next subbeam 110 that is scheduled to begin at the handover time. For example, the grant data 168 may indicate the next subbeam identifier, the handover time, uplink frequency, downlink frequency, assigned timeslot, signal encoding, predicted location data 162, and forth. The grant data 168 may be generated by one or more of the network management system 150 or a satellite 102. For example, the grant data 168 may be sent from the network management system 150 to the satellite 102 which then sends the grant data 168 to the UT 132. In another example, the satellite 102 that is designated to provide communication service starting at the handover time may receive the handover data 166 indicative of the handover and use its resource scheduler 106 to determine the grant data 168. For example, the resource scheduler 106 may use the predicted location data 162 to determine the subbeam 110 to be used. The grant data 168 is then provided to the UT 132.

The UT 132 includes a clock 152. For example, the clock 152 may comprise a GPS disciplined clock. The UT 132 includes a link module 104 to establish communication with the satellites 102 in the constellation.

Before the handover time, the first UT 132 may receive almanac data indicative of orbital elements of the orbit of the second satellite 102(2). In one implementation, the grant data 168 may include the orbital elements for the designated satellite 102. In another implementation, almanac data comprising orbital elements such as "two-line element" data for the satellites 102 in the constellation may be broadcast or otherwise sent to the UTs 132.

A tracking module 180 uses one or more of the current location of the UT 132 or the predicted location data 162, the grant data 168, and the almanac data 182 to determine tracking data 184 for the next satellite 102 to provide communication service at the handover time. For example, based on the predicted location of the UT 132 at the handover time and the predicted position and movement of the satellites 102, the tracking module 180 is able to calculate the tracking data 184. In another example, the tracking data 184 may be based on the current location. The tracking data 184 may include information indicative of azimuth, elevation, distance to the second satellite, time of flight correction 186, or other information at a specified time. The determination of the tracking data 184 may be ongoing. For example, the first UT 132 may determine tracking data 184 every 100 ms, every second, every five seconds, or at other intervals.

The time of flight correction 186 is based at least in part on the propagation time of signals between the first UT 132 and the satellite 102 that will be providing communication service beginning at the handover time. For example, as the satellite's 102 position changes over time, and the first UT 132 moves, the distance between the satellite 102 and the first UT 132 changes. Because the electromagnetic signal has a maximum speed of "c", as the distance changes so too does the amount of time it takes for a signal to travel between the first UT 132 and the satellite 102. In one implementation, the time of flight correction 186 may be determined by dividing the distance by c. In other implementations other factors may be considered, such as the portion of the distance that passes through the atmosphere, maximum time error that still allows communication, relativistic effects, and so forth. As described below in more detail, the time of flight correction 186 may be used to determine a time offset. The UT 132 may use the time offset to change when a signal is sent to the satellite 102 so that, when the signal is received, it is received within a particular window of time as measured by a clock onboard the satellite 102.

The distance between the UT 132 and the estimated location of the second satellite 102(2) at the handover time may be calculated given the actual location or predicted location of the UT 132 and the almanac data 182. For example, a predicted position of the satellite 102(2) may be calculated at the specified handover time using the almanac data 182. The distance may then be calculated based on the predicted location and the predicted position of the satellite 102(2). The distance "D" may also be known as the "slant range". The distance may be calculated using the following equations:

$$r = h + B \qquad (1)$$

where r=distance between the geocenter of Earth and the satellite and B is a distance between the geocenter and the UT 132

$$D = \sqrt{(B \cdot \cos(\epsilon))^2 + r^2 - B^2} - B \cdot \cos(\epsilon) \qquad (2)$$

where $\epsilon$ is an elevation angle to the satellite relative to local vertical and r is calculated as described in Equation 1.

The link module 104 of the UT 132 uses the time of flight correction 186 to adjust the timing of when signals are transmitted to the satellite 102. In some implementations the timing of when signals are received from the satellite 102 may also be adjusted based on the time of flight correction 186. In one implementation, the time of flight correction 186 may be used in conjunction with the time synchronization signal (see FIG. 3) and the clock 152 of the UT 132 to coordinate timing between the satellite 102 and the UT 132. For example, a time offset value may be determined based on a difference between a clock 152 on the UT 132 and coordinated to the time synchronization signal and the time of flight correction 186. The time offset value specifies how much the transmit timing of signals to the satellite 102 should be advanced or delayed such that the signals arrive at the satellite 102 within a threshold interval of a desired time. For example, the UT 132 adjusts when it transmits a signal based on the time offset value and the time synchronization signal. A similar operation may be used for receiving signals from the satellite 102.

From the perspective of the satellite 102, the satellite 102 is receiving signals from UTs 132 in which the timing is tightly coordinated to, and synchronized with, the internal clock 152 of the satellite 102. This allows greater utilization of the communication link by reducing the time between transmission of frames, providing more time for transmitting user data 134. By performing the time offset at the UT 132, the processing workload of the satellite 102 is substantially reduced. This reduces the cost and complexity of the satellite 102, reducing overall system cost.

With regard to FIG. 1, an uplink is a communication link which allows data to be sent to a satellite 102 from a gateway 130, UT 132, or device other than another satellite 102. Uplinks are designated as UL1, UL2, and so forth. For example, UL1 is a first uplink from the gateway 130 to the satellite 102 using subbeam 110(1). In comparison, a downlink is a communication link which allows data to be sent from the satellite 102 to a gateway 130, UT 132, or device other than another satellite 102. For example, DL1 is a first downlink from the satellite 102 to the gateway 130. In some implementations a crosslink may be provided to allow communication between satellites 102 in the constellation.

In some implementations, one or more functions of the network management system 150 may be provide by one or more satellites 102. For example, the tracking module 180 of the UT 132 may determine that, based on the predicted location data 162, the UT 132 will be moving from the footprint boundary of the first subbeam 110(1) into the footprint boundary of the second subbeam 110(2). The UT 132 may send to the satellite 102 a request for a handoff to the second subbeam 110(2). The first satellite 102(1) may generate the one or more of the handover data 166 or the grant data 168. The grant data 168 would then be sent to the UT 132.

In one implementation, the UT 132 is not required to use the grant data 168. For example, the grant data 168 is based on the predicted location data 162. If the actual location of the UT 132 differs from the predicted location data 162 by more than a threshold distance, the UT 132 may maintain communication with the satellite 102 using the current subbeam 110. Such flexibility allows the system to accommodate changes in the movement of the UT 132 and maintain communication service. For example, the UT 132 is attached to an aircraft that is approaching a footprint boundary of a first subbeam 110(1) and receives grant data 168 to transfer to the second subbeam 110(2). However, the aircraft then unexpectedly turns and begins flying back in the direction which it came from. The aircraft continues to use the first subbeam 110(1) and does not handover to the second subbeam 110(2).

Figure 2:
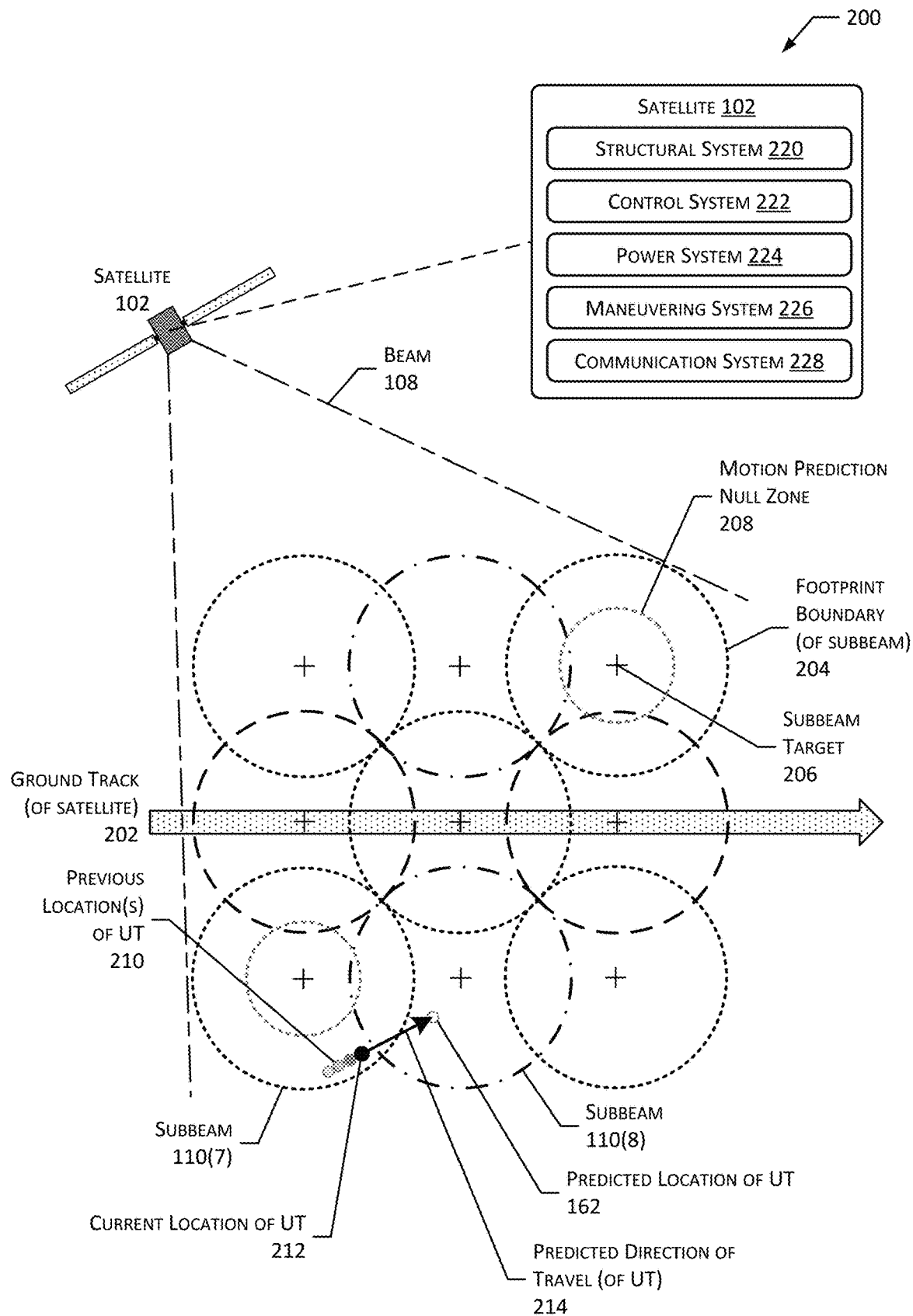
FIG. 2 illustrates systems of a satellite and subbeams provided by the satellite, and movement of the user terminal, according to some implementations.

FIG. 2 illustrates at 200 systems of the satellite 102 and subbeams 110 provided by the satellite 102, and movement of the user terminal 132, according to some implementations. A ground track 202 of the satellite 102 is depicted. The ground track 202 may be represented as the points directly beneath the satellite 102 as it orbits the Earth.

The satellite 102 in this illustration provides a beam 108 comprising nine subbeams 110(1), 110(2), . . . , 110(9). On the surface of the Earth, each subbeam 110 describes a footprint boundary 204. The footprint boundary 204 may be considered the boundary of the subbeam 110 within which a minimum radio frequency signal strength is provided by a transmitter on the satellite 102. In other implementations, the footprint boundary 204 may be described in other ways. For example, the footprint boundary 204 may comprise the perimeter of a projection of a cone corresponding to the subbeam 110. For ease of illustration, and not necessarily as a limitation, the footprint boundary 204 is depicted as circular. The footprint boundary 204 may vary due to operation of the satellite 102, relative position of the satellite with respect to a subbeam target 206, and so forth. For example, the footprint boundary 204 may change as the relative angle between the subbeam target 206 and the satellite 102 changes. In another example, the footprint boundary 204 may be approximately rectangular, irregular, and so forth.

Each subbeam 110 may be directed toward a particular subbeam target 206. For example, the subbeam target 206 may comprise a particular location that the subbeam 110 will be pointed at while in range. As the satellite 102 moves out of range, the subbeam 110 may be pointed at a different subbeam target 206. For example, the subbeam 110 may dwell for some period of time, and then "jump" to encompass a different geographic location.

In another implementation, the subbeams 110 may sweep across the Earth, moving parallel to the ground track 202. For example, the subbeams 110 may be maintained at a fixed angle relative to the Earth.

Depicted is an example of a motion prediction null zone 208. The motion prediction null zone (null zone) 208 may be determined based on the size of the footprint boundary 204 and the maximum possible movement of a UT 132. In some implementations, the null zone 208 may differ based on type of vehicle, such as automobile, aircraft, train, and so forth. As mentioned above, this information may be included in the user terminal data 160. Based on the maximum possible movement, or other factors, the UT 132 may be assumed to be unable to move from any point within the null zone 208 to a predicted location that is outside the footprint boundary 204. For example, the vehicle to which the UT 132 is associated would not be able to move from a point on the perimeter of the null zone 208, away from the center of the footprint boundary 204, to a point that is outside the footprint boundary 204.

In some implementations, the null zone 208 or an equivalent mechanism may be used to determine whether to perform other functions. For example, UTs 132 having an actual location that is within the null zone 208 may be omitted from consideration for handover to another subbeam 110. This results in a significant reduction in the overall processing requirements for the system, improving system efficiency and reducing latency during operation of the system. For example, no predicted location data 162 is determined for a UT 132 having an actual location in the null zone 208. In another implementation, a boundary region (not shown) may be designated that extends along a perimeter of the footprint boundary 204.

In one implementation, a determination may be made based on the distance between the current location of the UT 132 and the subbeam target 206. If the distance is greater than a threshold value, predicted location data 162 may be determined and a potential handover to another subbeam evaluated.

As shown in FIG. 2, a set of previous locations 210 of the UT 132 are shown within subbeam 110(7). For example, the set of previous locations 210 may be determined based on data received from the UT 132 during previous times. A current location 212 of the UT 132 is also shown. A predicted direction of travel 214 is shown. For example, a linear quadratic estimation (LQE) algorithm may be used to determine the predicted location data 162. The predicted direction of travel 214 may be based on one or more of the previous locations 210 or the current location 212.

The satellite 102 may comprise a structural system 220, a control system 222, a power system 224, a maneuvering system 226, and a communication system 228. In other implementations, some systems may be omitted or other systems added. One or more of these systems may be communicatively coupled with one another in various combinations.

The structural system 220 comprises one or more structural elements to support operation of the satellite 102. For example, the structural system 220 may include trusses, struts, panels, and so forth. The components of other systems may be affixed to, or housed by, the structural system 220. For example, the structural system 220 may provide mechanical mounting and support for solar panels in the power system 224. The structural system 220 may also provide for thermal control to maintain components of the satellite 102 within operational temperature ranges. For example, the structural system 220 may include louvers, heat sinks, radiators, and so forth.

The control system 222 provides various services, such as operating the onboard systems, resource management, providing telemetry, processing commands, and so forth. For example, the control system 222 may direct operation of the communication system 228.

The power system 224 provides electrical power for operation of the components onboard the satellite 102. The power system 224 may include components to generate electrical energy. For example, the power system 224 may comprise one or more photovoltaic cells, thermoelectric devices, fuel cells, and so forth. The power system 224 may include components to store electrical energy. For example, the power system 224 may comprise one or more batteries, fuel cells, and so forth.

The maneuvering system 226 maintains the satellite 102 in one or more of a specified orientation or orbit. For example, the maneuvering system 226 may stabilize the satellite 102 with respect to one or more axis. In another example, the maneuvering system 226 may move the satellite 102 to a specified orbit. The maneuvering system 226 may include one or more computing devices, sensors, thrusters, momentum wheels, solar sails, drag devices, and so forth. For example, the sensors of the maneuvering system 226 may include one or more global navigation satellite system (GNSS) receivers, such as global positioning system (GPS) receivers, to provide information about the position and orientation of the satellite 102 relative to Earth. In another example, the sensors of the maneuvering system 226 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 228 provides communication with one or more other devices, such as other satellites 102, gateways 130, user terminals 132, and so forth. The communication system 228 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, gateways 130, user terminals 132, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 228 may be output to other systems, such as to the control system 222, for further processing. Output from a system, such as the control system 222, may be provided to the communication system 228 for transmission.

The satellite 102, the gateways 130, the UT 132, the user device 136, the network management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth.

Figure 3:
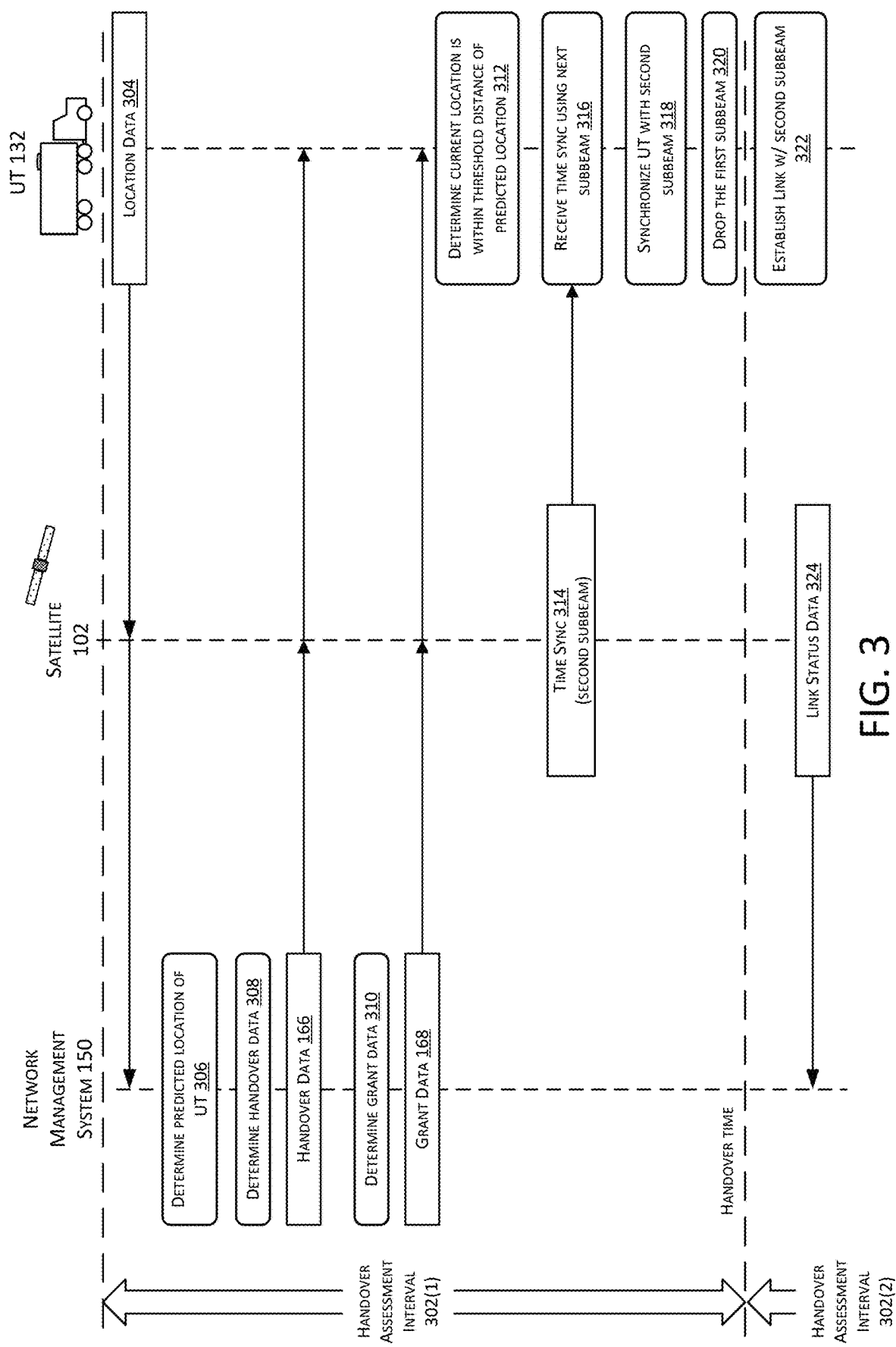
FIG. 3 illustrates a process of providing a low latency handover of satellite communication service from a first subbeam to a second subbeam, according to some implementations.

FIG. 3 illustrates a process 200 of providing a low latency handover of satellite communication service from a first subbeam 110(1) to a second subbeam 110(2), according to some implementations. In this illustration, time generally increases from top to bottom. For example, an operation depicted at the top of the page may occur before an operation depicted at the bottom of the page.

In this illustration, the network management system 150, the satellite 102, and the UT 132 are shown. The gateway(s) 130 and other elements are omitted from this illustration for clarity, and not as a limitation.

While the system 100 is operating, the network management system 150 determines and sends handover data 166 during handover assessment intervals 302. For example, each handover assessment interval 302 may be five seconds long. In other implementations, other durations of handover assessment interval 302 may be used. The handover assessment interval 302 determines the handover data 166 for the next handover assessment interval 302. For example, during a first handover assessment interval 302(1), the network management system 150 determines the handover data 166 used to handle the handover occurring at the start of the second handover assessment interval 302(2).

During the first handover assessment interval 302(1), communication service are being provided by a first subbeam 110(1) of the satellite 102 to the UT 132. Location data 304 indicative of one or more of a previous location 210 of the UT 132, a current location 212 of the UT 132, or predicted location data 162 is sent from the UT 132 to the network management system 150. The first subbeam 110(1) may be used to transfer data between the satellite 102 and the UT 132 until the drop of the first subbeam 110(1) occurs at 320, as described below. Meanwhile, the rest of the process described herein may continue contemporaneously. Uplink data may also be sent from the UT 132 to the satellite 102 while downlink data is sent from the satellite 102 to the UT 132. Uplink data and downlink data are omitted from this figure for clarity.

At 306 the predicted location data 162 is determined. For example, the network management system 150 may use the location data 304 to determine the predicted location data 162.

At 308, the network management system 150 determines the handover data 166 and sends that handover data 166 to the satellite 102. For example, based at least on the predicted location data 162 and the user terminal data 160, handover data 166 is determined that indicates that the second subbeam 110(2) will be providing communication service to the UT 132 at the next handover time. In other implementations, the network management system 150 may use other data to determine the handover data 166.

Based on the handover data 166, at 310 the grant data 168 is determined. The determination of the grant data 168 may be performed by one or more of the network management system 150, the first satellite 102, or another device. For example, the satellite 102 may receive the handover data 166. The onboard resource scheduler 106 may then use the handover data 166 to determine which satellite resources are expected to be available during the upcoming second handover assessment interval 302(2), and generate the grant data 168. The grant data 168 is also sent to the UT 132. For example, the grant data 168 may be sent to the satellite 102 that is currently providing communication service to the UT 132 using a first subbeam 110(1). The satellite 102 may send the grant data 168 to the UT 132.

At this point, based on the grant data 168, the satellite 102 knows in advance of the start of the second handover assessment interval 302(2) what the parameters will be for communicating with the UT 132 using the second subbeam 110(2). Likewise, the UT 132 knows in advance that it will be able to communicate with the satellite 102 using the second subbeam 110(2), and the parameters of that communication.

As the handover time approaches, at 312 the UT 132 determines that the current location is within a threshold distance of the predicted location indicated by the predicted location data 162. If the UT 132 determines it is within the threshold distance, the process may proceed. In other implementations, other determination may be made. For example, the grant data 168 may include data indicative of the footprint boundary 204 for the second subbeam 110(2). If the current location 212 of the UT 132 is within the footprint boundary 204 of the second subbeam 110(2), the process may proceed.

Meanwhile, the satellite 102 sends a time synchronization signal 314 via the second subbeam 110(2). The time synchronization signal 314 may be addressed to a specific device, such as a particular UT 132, or may be broadcast to multiple devices. The time synchronization signal 314 may be sent for the entire beam 108, or for one or more individual subbeams 110.

At 316 the first UT 132 receives the time synchronization signal 314 and may synchronize the clock 152 onboard the UT 132 to the time synchronization signal 314. In some implementations, information such as the time of flight correction 186 may be used to determine a corrected time that takes into consideration time of flight of the time synchronization signal 314, relativistic effects, and so forth.

At 320, the UT 132 drops communication service with the satellite 102 using the first subbeam 110(1). For example, the link module 104 onboard the UT 132 drops the communication link to the satellite 102.

At 322, based on the grant data 168, the UT 132 establishes communication service with the satellite 102 using the second subbeam 110(2). Because the UT 132 and the satellite 102 had the grant data 168 in advance, they are ready to establish the link and begin communication with a minimal handshake or other interchange. This substantially reduces the latency of the handover time from one subbeam 110 to another.

With the link between the satellite 102 and the UT 132 using the second subbeam 110(2) established, transfer of user data 134 may resume.

Link status data 324 may be sent to the network management system 150. For example, one or more of the satellite 102 or the UT 132 may send the link status data 324 to the network management system 150. The link status data 324 may be indicative of one or more of the UT 132 successfully transferring to the second subbeam 110(2) or that the UT 132 did not transfer to the second subbeam 110(2). In some implementations, the link status data 324 may include data indicative of why the transfer to the second subbeam 110(2) did not take place. For example, the link status data 324 may indicate that the UT 132 was not within the threshold distance of the predicted location, or that the UT 132 did not receive the time synchronization signal 314 for the second subbeam 110(2).

Meanwhile, the network management system 150 determines the handover data 166 for the next handover assessment interval 302. The process may continue on, determining in advance the handover data 166 and corresponding grant data 168 in advance of the next handover. In addition to the determination of handovers between subbeams 110, the network management system 150 may also determine a handover from a first satellite 102(1) to a second satellite 102(2).

By using the system 100 as described, overall reliability and throughput of the system 100 is substantially improved. Latency in the transfer of user data 134 due to the handover is substantially reduced. The process also substantially reduces the delays associated with, and the consumption of resources at, one or more of the satellites 102, at the gateways 130, or the network management system 150 of techniques that rely on communication link metrics to determine when and how to handover communication service to another subbeam 110. Instead of attempting to determine when a link becomes marginal and then performing the handover, the handover is determined in advance. The system 100 also significantly reduces the traffic that would otherwise be associated with a satellite 102 attempting to transfer communication service to another subbeam.

Figure 4:
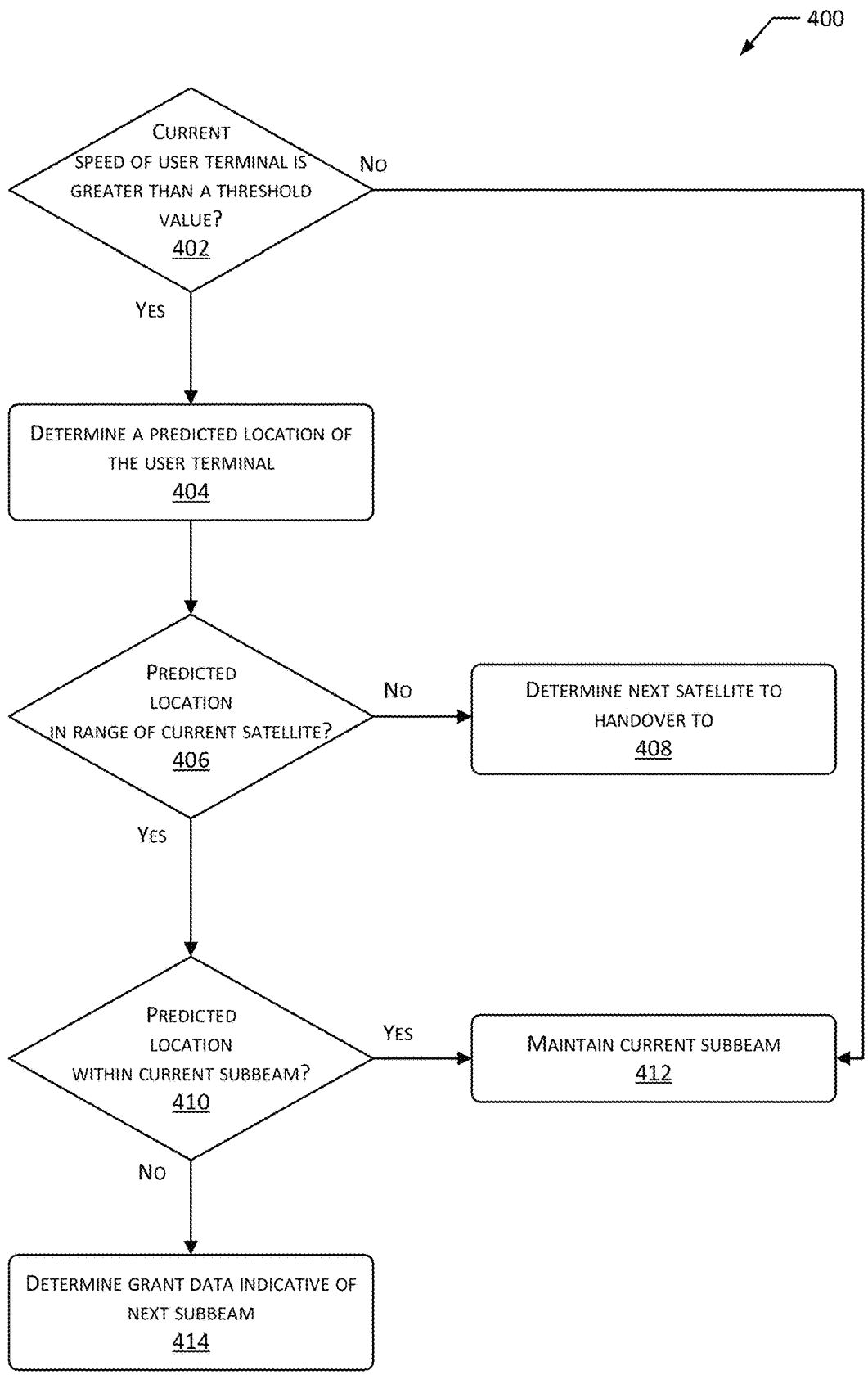
FIG. 4 illustrates a process of determining grant data, according to some implementations.

FIG. 4 illustrates at 400 a process of determining grant data, according to some implementations. The process may be implemented by one or more of the network management system 150, the UT 132, the satellite 102, or other devices.

At 402, a determination is made as to whether a current speed of the UT 132 is greater than a threshold value. The threshold value may be selected to preclude the possibility of the UT 132 moving a sufficient distance to move outside of the footprint boundary 204 of the current subbeam 110. For example, the threshold value maybe be 10 meters per second. If the current speed of the UT 132 is less than the threshold value, the process may proceed to 412. At 412, the current subbeam 110 is maintained. If the current speed is greater than the threshold value, the process proceeds to 404.

The determination at 402 substantially reduces the amount of data processed by the system 100 by eliminating processing of data associated with UTs 132 that are unlikely to move outside of the current footprint boundary 204 by the start of the next handover time.

If communication with either the current or the next subbeam 110 fails, the system 100 may proceed to perform an initial link establishment procedure. For example, the UT 132 may detect timing signals from satellites 102 that are in view and initiate a handshake process.

In some implementations the system 100 may determine the speed based on a portion of the predicted direction of travel 214 that is relative to one or more of the subbeam target 206, the footprint boundary 204, and so forth. For example, a radial component of the predicted direction of travel 214 may be determined that is indicative of the motion of the UT 132 away from the subbeam target 206.

In other implementations, other determinations may be used. For example, instead of speed, a determination may be made as to whether the current location 212 of the UT 132 exceeds a second threshold distance away from a previous location 210 of the UT 132. For example, the current location 212 may be compared with the previous location 210 obtained 60 seconds ago. If the distance between these two points exceeds the second threshold distance, the process may proceed to 404. Otherwise, the process would proceed to 412.

At 404 a predicted location of the UT 132 is determined. For example, the predicted location data 162 may be determined by the UT 132 and then sent to the network management system 150. In another example, the network management system 150 may use previously obtained location data about the UT 132 to determine the predicted location.

At 406 a determination is made as to whether the predicted location is in range of the current satellite 102. For example, the orbital mechanics system 154 may generate orbital data 156 that indicates whether the current satellite 102 will be in range of the UT 132 at the conclusion of the next handover assessment interval 302. Continuing the example, the system 100 may determine that the current satellite 102 will be in range for the entirety of the next handover assessment interval 302. If no, the current satellite 102 is not expected to be in range, the process proceeds to 408.

At 408, the system 100 determines the next satellite 102 to provide communication service to the UT 132. Handover data 166 and grant data 168 indicative of the next satellite 102 may then be provided to the UT 132.

Returning to 406, if the predicted location of the UT 132 is in range of the current satellite 102, the process proceeds to 410. At 410 a determination is made as to whether the predicted location is within the current subbeam 110. If yes, the process proceeds to 412. If no, the process proceeds to 414.

In one implementation, the predicted location data 162 may be compared to data indicative of the footprint boundary 204 to determine if the predicted location data 162 is within the footprint boundary 204. For example, the footprint boundary 204 for a subbeam 110 may be expressed as a set of coordinates of the subbeam target 206 and a radius value. A distance between the subbeam target 206 and the predicted location may be calculated, and if that distance is less than the radius value, the predicted location may be deemed within the footprint boundary 204.

At 414 the grant data 168 indicative of the next subbeam 110 is determined. In one implementation, the predicted location data 162 may be compared with the footprint boundaries 204 for a plurality of the subbeams 110 that are provided by the satellite 102. For example, the next subbeam 110 may be selected based on distance between the predicted location and the subbeam targets 206. The subbeam 110 associated with the subbeam target 206 closest to the predicted location may be selected as the next subbeam 110. The grant data 168 may then be determined that is indicative of that selected subbeam 110.

The subbeam 110 selected for providing service to a UT 132 may be based at least in part on other considerations. For example, current capacity of the subbeams 110, estimated capacity of the subbeams 110 during the next handover assessment interval 302, and so forth. Continuing the example, the predicted location of the UT 132 may be closer to the subbeam target 206(3) of subbeam 110(3) than the subbeam target 206(2) of subbeam 110(2), but subbeam 110(2) may be scheduled to carry less data traffic during the next handover assessment interval and thus have greater estimated capacity at that time. As a result, subbeam 110(2) may be selected and subsequently included in the grant data 168.

FIG. 5 illustrates data associated with operation of the system 100, according to some implementations. The data may include a parameter 502 and an associated value 504.

The handover data 166 may include parameters 502 and corresponding values 504 for a user terminal identifier, next satellite identifier, handover time, resource priority, subbeam identifier, predicted location, handover likelihood, and so forth. For example, the UT identifier may comprise a media access control value that indicates a particular UT 132. In some implementations a temporary UT identifier may be used. A temporary UT identifier may be assigned to a particular UT 132 within a particular subbeam 110. If that same UT 132 transfers to use a different subbeam 110, a different temporary UT identifier would be issued. For example, the UT 132 having the UT identifier of "568451998873" may be assigned a first temporary UT ID of "15" while using subbeam 110(1) and then assigned a second temporary UT ID of "3" while using subbeam 110(2). Use of the temporary UT identifier may reduce the quantity of data transmitted. For example, instead of a 64 byte UT identifier a 4 bit value may be used.

The next satellite identifier may indicate the serial number or other identifier that denotes a specific satellite 102 in the constellation. The handover time may indicate a particular handover time that the handover data 166 is associated with. The resource priority may indicate the priority to be considered by the resource scheduler 106 when allocating resources for communication service to the associated UT 132.

The handover likelihood may comprise data indicative of a likelihood that the handover will take place. The handover likelihood may be determined based on a confidence value associated with the predicted location data 162. For example, if the UT 132 is moving in an erratic and unpredictable course, the confidence value in the predicted location data 162 will be relatively low. Because the predicted location data 162 is relatively uncertain, it is also uncertain that the UT 132 will be at the predicted location at the handover time.

The handover likelihood may also be determined based at least in part on previously acquired data such as historical locations. For example, historical data indicative of previously predicted locations and the resulting actual locations may be used. The source of the data for the predicted location may also be used to determine the handover likelihood. For example, if the UT 132 is receiving data from a vehicle navigation system, the predicted location based on the planned route for that vehicle may be deemed highly likely as compared to a naïve estimation of predicted location based on previous motions.

The grant data 168 may include parameters 502 and corresponding values 504 for the UT identifier, next satellite identifier, the handover time, synchronization data, subbeam identifier, subbeam footprint data, uplink frequencies, downlink frequencies, timeslot(s), grant expiration time, encoding scheme, and so forth.

The synchronization data provides information to the UT 132 about the time synchronization signal 314 used to synchronize the UT 132 with the second subbeam 110(2). For example, the synchronization data may indicate a frequency, encoding, or other parameter to allow the UT 132 to determine the time synchronization to be used.

The subbeam identifier provides information about the subbeam to be made available to the UT 132 for use.

The subbeam footprint data may provide information about the footprint boundary 204 for the second subbeam 110(2). For example, the subbeam footprint data may comprise a set of geographic coordinates and a radius in kilometers. In other implementations, the subbeam footprint data may be designated in other ways. For example, as a set of grid square identifiers, two or more coordinates, and so forth.

The grant data 168 may include uplink frequencies for use by the UT 132 to send to the satellite 102 while the downlink frequencies are for use by the UT 132 to receive from the satellite 102.

The timeslot may indicate an interval of time during which communication between the UT 132 and the satellite 102 is allocated to take place. The timing of a timeslot may be relative to the time synchronization signal. For example, each second may be divided into ten 100 ms timeslots. The first UT 132 may be allocated to send and receive traffic during the fifth timeslot, while other UTs 132 are allocated the remaining time slots for use.

The grant for use of the second subbeam 110(2) or other satellite 102 resources may expire. For example, if the link module 104 does not establish communication via the second subbeam 110(2) with the UT 132 within a threshold period of time, the resource scheduler 106 may deallocate the resources associated with the grant data 168. This deallocation may free up those resources to be used for other functions, reduce power consumption, and so forth. For example, the deallocation may result in the satellite 102 discontinuing tracking the UT 132 with a spot beam.

The tracking data 184 may include parameters 502 and corresponding values 504 for the current location of the UT 132, predicted location of the UT 132, the handover time, azimuth and elevation, time of flight correction 186, and so forth. For example, the current location may be determined using output from a global position system (GPS) receiver, manual input, and so forth. In some implementations, prior to the handover time, initial azimuth and elevation may be determined, initial time of flight correction 186, and so forth. For example, the predicted location may be used to determine the various parameters. This allows the UT 132 to quickly determine whether to use the second subbeam 110(2), and if so, to establish communication using the second subbeam 110(2) at the designated handover time.

The link status data 324 may include parameters 502 and corresponding values 504 for the UT identifier, handover time, subbeam in use, error code, and so forth. For example, the satellite 102 or the UT 132 may provide data to the network management system 150 that indicates whether the UT 132 used the grant data 168 and transferred to the second subbeam 110(2). If not, the error code or other data in the link status data 324 may be used to provide information as to why the handover did not take place. For example, the UT 132 was not within the threshold distance of the predicted location, or the UT 132 was unable to receive the time synchronization signal 314, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a satellite in a non-geosynchronous orbit, wherein the satellite provides a first subbeam for communication and a second subbeam for communication;
a first user terminal (UT) that is in communication with the satellite using the first subbeam at a first time; and
a network management system to:
determine a first location of the first UT at the first time;
determine, before a second time that is after the first time, a second location of the first UT at the second time;
determine that the second location is within a footprint boundary of the second subbeam;
determine grant data indicative of one or more parameters associated with communication between the first UT and the satellite using the second subbeam at the second time; and
send the grant data to:
the satellite, and
the first UT.

2. The system of claim 1, wherein the network management system determines the second location based on one or more of:
a plurality of locations that are associated with the first UT before the first time, or
data that is indicative of a pre-planned path of a vehicle associated with the first UT.

3. The system of claim 1, wherein to determine the second location the network management system to further:
determine a speed of the first UT at or before the first time; and
determine the speed is greater than a threshold value.

4. The system of claim 1, the network management system to further:
determine a direction of travel of the first UT at or before the first time; and
determine the direction of travel is towards the footprint boundary of the second subbeam.

5. The system of claim 1, the grant data comprising one or more of:
data indicative of the footprint boundary of the second subbeam,
data indicative of a frequency associated with use of the second subbeam, or
data indicative of a timeslot associated with use of the second subbeam.

6. The system of claim 1 wherein to determine the second location, the network management system to further:
determine a speed of the first UT at or before the first time; or
determine the speed is greater than a threshold value; or
determine that the first location is within a threshold distance of a footprint boundary of the first subbeam.

7. The system of claim 1, the network management system to further:
determine first data indicative of one or more:
number of user terminals in service within one or more of the first subbeam or the second subbeam,
current bandwidth in use by one or more of the first subbeam or the second subbeam, or
predicted bandwidth to be used by one or more of the first subbeam or the second subbeam after the second time; and
wherein the determination of the grant data is further based on the first data.

8. The system of claim 1, the first UT to:
receive the grant data;
determine a third location of the first UT at the second time;
discontinue communication with the satellite using the first subbeam; and
establish communication with the satellite using the second subbeam on or after the second time.

9. A method comprising:
determining that a satellite in a non-geosynchronous orbit is in communication with a first user terminal (UT) at a first location at a first time using a first subbeam;
determining, before a second time that is after the first time, a second location of the first UT at the second time;
determining that the second location is within a footprint boundary of a second subbeam of the satellite;
determining grant data indicative of one or more parameters associated with communication between the first UT and the satellite using the second subbeam at the second time; and
sending the grant data to one or more of:
the satellite,
the first UT, or
a network management system communicatively coupled to the satellite and the first UT.

10. The method of claim 9, the determining the second location comprising one or more of:
determining a plurality of locations that are associated with the first UT before the first time, or
determining data that is indicative of a pre-planned path of a vehicle associated with the first UT.

11. The method of claim 9, wherein the determining the grant data is responsive to one or more of:
determining a speed of the first UT at or before the first time is greater than a threshold value, or
determining the first location is within a threshold distance of a footprint boundary of the first subbeam.

12. The method of claim 9, the grant data comprising one or more of:
data indicative of the footprint boundary of the second subbeam,
data indicative of a frequency associated with use of the second subbeam, or
data indicative of a timeslot associated with use of the second subbeam.

13. The method of claim 9, further comprising:
determining first data indicative of:
number of user terminals in service within one or more of the first subbeam or the second subbeam,
current bandwidth in use by one or more of the first subbeam or the second subbeam,
predicted bandwidth to be used by one or more of the first subbeam or the second subbeam; and
wherein the determination of the grant data is further based on the first data.

14. The method of claim 9, further comprising:
determining a third location of the first UT at the second time;
determining, by the first UT and based at least in part on the third location, to accept the grant data;
discontinuing, by the first UT, communication with the satellite using the first subbeam; and establishing, by the first UT, communication with the satellite using the second subbeam on or after the second time.

15. A method comprising:

establishing communication between a satellite in a non-geosynchronous orbit and a first user terminal (UT) using a first subbeam provided by the satellite;

determining a first location of the first UT at a first time;

determining a second location of the first UT at a second time;

receiving grant data that is indicative of one or more parameters associated with communication between the first UT and the satellite using a second subbeam at the second time;

discontinuing, after the first time, communication between the satellite and the first UT using the first subbeam; and establishing, at the second time and based on the grant data, communication between the satellite and the first UT using the second subbeam.

16. The method of claim 15, further comprising:

determining the grant data responsive to one or more of:
 determining a speed of the first UT at or before the first time is greater than a threshold value, or
 determining the first location is within a threshold distance of a footprint boundary of the first subbeam.

17. The method of claim 15, further comprising:

determining first data indicative of:
 number of user terminals in service within one or more of the first subbeam or the second subbeam,
 current bandwidth in use by one or more of the first subbeam or the second subbeam,
 predicted bandwidth to be used by one or more of the first subbeam or the second subbeam; and
 determining the grant data based at least in part on the first data.

18. The method of claim 15, further comprising:

determining, by the first UT, the second location based on one or more of:
 a plurality of locations that are associated with the first UT before the first time, or
 data that is indicative of a pre-planned path of a vehicle associated with the first UT.

19. The method of claim 15, the grant data comprising one or more of:

data indicative of a footprint boundary of the first subbeam, or data indicative of a footprint boundary of the second subbeam, and wherein the discontinuing and the establishing at the second time is based at least in part on the grant data.

20. The method of claim 15, further comprising:

determining a third location of the first UT at the second time;

determining, based at least in part on the third location, to accept the grant data; and wherein the discontinuing and the establishing at the second time is responsive to the determination to accept.

* * * * *